(12) United States Patent
Furuya

(10) Patent No.: US 11,290,654 B2
(45) Date of Patent: Mar. 29, 2022

(54) IMAGE CAPTURING APPARATUS, LIGHT EMISSION CONTROL APPARATUS, IMAGE CAPTURING METHOD, AND LIGHT EMISSION CONTROL METHOD

(71) Applicant: CANON KABUSHIKI KAISHA, Tokyo (JP)

(72) Inventor: Kohei Furuya, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 22 days.

(21) Appl. No.: 16/871,416

(22) Filed: May 11, 2020

(65) Prior Publication Data

US 2020/0366826 A1   Nov. 19, 2020

(30) Foreign Application Priority Data

May 14, 2019   (JP) .............................. JP2019-091616

(51) Int. Cl.
| | | |
|---|---|---|
| *H04N 5/235* | (2006.01) | |
| *G06T 5/50* | (2006.01) | |
| *G06K 9/46* | (2006.01) | |
| *G06K 9/78* | (2006.01) | |

(52) U.S. Cl.
CPC ......... *H04N 5/2354* (2013.01); *G06K 9/4661* (2013.01); *G06K 9/78* (2013.01); *G06T 5/50* (2013.01); *G06T 2207/20221* (2013.01); *G06T 2207/20224* (2013.01)

(58) Field of Classification Search
None
See application file for complete search history.

(56) References Cited

U.S. PATENT DOCUMENTS

| | | | | |
|---|---|---|---|---|
| 9,819,872 | B2* | 11/2017 | Yoshikawa | ............ G01B 11/25 |
| 10,816,939 | B1* | 10/2020 | Coleman | ................. G01S 17/86 |
| 2004/0212725 | A1* | 10/2004 | Raskar | ................. H04N 5/2625 |
| | | | | 348/370 |
| 2009/0025747 | A1* | 1/2009 | Edgar | ................... B05B 5/1691 |
| | | | | 132/320 |
| 2012/0314103 | A1* | 12/2012 | Majewicz | ............ H04N 1/4092 |
| | | | | 348/239 |
| 2014/0092215 | A1* | 4/2014 | Hayama | ............. A61B 1/00045 |
| | | | | 348/45 |

(Continued)

FOREIGN PATENT DOCUMENTS

| | | |
|---|---|---|
| JP | 2002-027316 A | 1/2002 |
| JP | 2010-008832 A | 1/2010 |

*Primary Examiner* — James M Hannett
(74) *Attorney, Agent, or Firm* — Cowan, Liebowitz & Latman, P.C.

(57) ABSTRACT

There is provided an image capturing apparatus. A first image is obtained by taking a shot without causing any of N light emission apparatuses (N≥2) to emit light. N second images are obtained by taking shots respectively at the times of light emissions by the N light emission apparatuses which are caused to perform the light emissions one at a time. A generating unit generates a plurality of third images including N difference images, each difference image corresponding to a difference between respective one of the N second images and the first image, and M composite images (M≥1) corresponding to M compositing patterns at which two or more of the N difference images are composited. A selection unit selects one of the plurality of third images.

14 Claims, 7 Drawing Sheets

(56) References Cited

U.S. PATENT DOCUMENTS

| | | | |
|---|---|---|---|
| 2015/0355101 A1* | 12/2015 | Sun | G01N 21/8806 |
| | | | 348/46 |
| 2017/0111572 A1* | 4/2017 | Kusumi | H04N 5/2354 |
| 2018/0068433 A1* | 3/2018 | Imakoga | G06T 7/0006 |
| 2018/0075612 A1* | 3/2018 | Michielin | G02B 23/2461 |

* cited by examiner

FIG. 7

| 701 | 702 | 703 |
|---|---|---|
| CRISP AND VIVID | PRIORITIZE HIGHER SHADOW STRENGTH, LOWER SHADOW SURFACE AREA | SET β LOWER, α HIGHER |
| SOFT | PRIORITIZE LOWER SHADOW STRENGTH AND SHADOW SURFACE AREA | SET αβ HIGHER |
| WARM AND GENTLE | PRIORITIZE LOWER SHADOW STRENGTH | SET β HIGHER |
| MOIST AND DEEP | PRIORITIZE HIGHER SHADOW STRENGTH | SET β LOWER |
| FAINTLY DARK AND QUIET | PRIORITIZE HIGHER SHADOW STRENGTH AND SHADOW SURFACE AREA | SET αβ LOWER |
| CLEAR | PRIORITIZE HIGHER LIGHT SURFACE AREA AND STRENGTH | SET γδ HIGHER |
| DARK | PRIORITIZE LOWER LIGHT SURFACE AREA AND STRENGTH | SET γδ LOWER |
| MONOCHROME | PRIORITIZE HIGHER CONTRAST | SET ζ HIGHER |

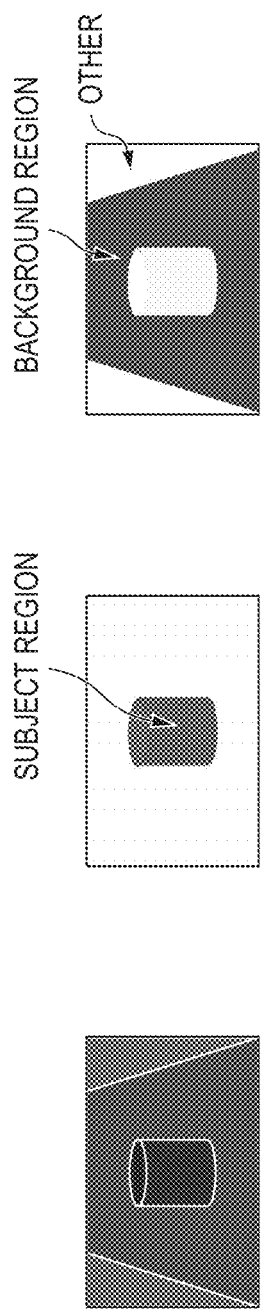

IMAGE CAPTURING APPARATUS, LIGHT EMISSION CONTROL APPARATUS, IMAGE CAPTURING METHOD, AND LIGHT EMISSION CONTROL METHOD

BACKGROUND OF THE INVENTION

Field of the Invention

The present invention relates to an image capturing apparatus, a light emission control apparatus, an image capturing method, and a light emission control method.

Description of the Related Art

Flash shooting is an image shooting technique which has been carried out for some time. In flash shooting, a subject is illuminated with light in order to obtain an image that compensates for insufficient lighting, eliminates shadows on the subject, and so on. Although flash shooting makes it possible to compensate for insufficient lighting, there are situations where the flash light is blocked by the subject itself, producing new shadows that were not originally present. To address this issue, a shooting method is known in which a subject is illuminated from a plurality of directions using a plurality of light emission apparatuses. With such a shooting method, the manner in which shadows appear can be adjusted by using the plurality of light emission apparatuses to illuminate the subject from a plurality of directions. Here, increasing the number of light emission apparatuses increases the freedom of the illumination. However, doing so also makes it necessary to correspondingly adjust the light amounts of the plurality of light emission apparatuses, which is problematic in that it takes time before an image can be shot.

To address this problem, for example, Japanese Patent Laid-Open No. 2010-008832 discloses a configuration in which a plurality of complete images, corresponding to situations where a plurality of light emission apparatuses emit light at a plurality of light emission ratios, are generated and presented to a user. The user then selects a complete image, and a shot is taken while emitting light at the light emission ratio corresponding to the selected image.

Additionally, Japanese Patent Laid-Open No. 2002-027316 discloses a configuration in which a plurality of shots are taken while causing a plurality of light emission apparatuses emit light, and an image having a favorable light distribution is generated by performing weighted composition of the obtained images afterwards.

According to Japanese Patent Laid-Open No. 2010-008832, the time required to adjust the light amounts of the light emission apparatuses can be shortened to a certain extent. However, as the number of light emission apparatuses increases, so too does the number of options, and there is thus a problem in that it ultimately takes time before an image can be shot. With Japanese Patent Laid-Open No. 2002-027316, if, for example, the subject is moving, it is possible that the compositing process will produce an unnatural image.

SUMMARY OF THE INVENTION

Having been achieved in light of such circumstances, the present invention provides a technique for automatically selecting a light emission pattern for a plurality of light emission apparatuses.

According to a first aspect of the present invention, there is provided an image capturing apparatus comprising at least one processor and/or at least one circuit which functions as: a control unit configured to carry out control so as to obtain a first image by taking a shot without causing any of N light emission apparatuses (where N is an integer of 2 or greater) to emit light, and to obtain N second images by taking shots respectively at the times of light emissions by the N light emission apparatuses which are caused to perform the light emissions one at a time; a generating unit configured to generate a plurality of third images including N difference images, each difference image corresponding to a difference between respective one of the N second images and the first image, and M composite images (where M is an integer of 1 or greater) corresponding to M compositing patterns at which two or more of the N difference images are composited; and a selection unit configured to select one of the plurality of third images on the basis of a pixel value in each of the plurality of third images, wherein the control unit carries out control so as to obtain a fourth image by causing P light emission apparatuses (where P is an integer greater than or equal to 1 and less than or equal to N), among the N light emission apparatuses, that correspond to P of the N second images corresponding to P of the N difference images constituting the selected third image, to emit light.

According to a second aspect of the present invention, there is provided a light emission control apparatus comprising at least one processor and/or at least one circuit which functions as: an obtainment unit configured to obtain a first image generated by taking a shot without causing any of N light emission apparatuses (where N is an integer of 2 or greater) to emit light, and obtain N second images generated by taking shots respectively at the times of light emissions by the N light emission apparatuses which are caused to perform the light emissions one at a time; a generating unit configured to generate a plurality of third images including N difference images, each difference image corresponding to a difference between respective one of the N second images and the first image, and M composite images (where M is an integer of 1 or greater) corresponding to M compositing patterns at which two or more of the N difference images are composited; a selection unit configured to select one of the plurality of third images on the basis of a pixel value in each of the plurality of third images; and a control unit configured to carry out control so as to cause P light emission apparatuses (where P is an integer greater than or equal to 1 and less than or equal to N), among the N light emission apparatuses, that correspond to P of the N second images corresponding to P of the N difference images constituting the selected third image, to emit light.

According to a third aspect of the present invention, there is provided an image capturing method executed by an image capturing apparatus, comprising: carrying out control so as to obtain a first image by taking a shot without causing any of N light emission apparatuses (where N is an integer of 2 or greater) to emit light, and to obtain N second images by taking shots respectively at the times of light emissions by the N light emission apparatuses which are caused to perform the light emissions one at a time; generating a plurality of third images including N difference images, each difference image corresponding to a difference between respective one of the N second images and the first image, and M composite images (where M is an integer of 1 or greater) corresponding to M compositing patterns at which two or more of the N difference images are composited; selecting one of the plurality of third images on the basis of a pixel value in each of the plurality of third images; and carrying out control so as to obtain a fourth image by causing P light emission apparatuses (where P is an integer greater than or equal to 1 and less than or equal to N), among the N light emission apparatuses, that correspond to P of the N second images corresponding to P of the N difference images constituting the selected third image, to emit light.

According to a fourth aspect of the present invention, there is provided a light emission control method executed by a light emission control apparatus, comprising: obtaining a first image generated by taking a shot without causing any of N light emission apparatuses (where N is an integer of 2 or greater) to emit light, and obtaining N second images generated by taking shots respectively at the times of light emissions by the N light emission apparatuses which are caused to perform the light emissions one at a time; generating a plurality of third images including N difference images, each difference image corresponding to a difference between respective one of the N second images and the first image, and M composite images (where M is an integer of 1 or greater) corresponding to M compositing patterns at which two or more of the N difference images are composited; selecting one of the plurality of third images on the basis of a pixel value in each of the plurality of third images; and carrying out control so as to cause P light emission apparatuses (where P is an integer greater than or equal to 1 and less than or equal to N), among the N light emission apparatuses, that correspond to P of the N second images corresponding to P of the N difference images constituting the selected third image, to emit light.

Further features of the present invention will become apparent from the following description of exemplary embodiments with reference to the attached drawings.

BRIEF DESCRIPTION OF THE DRAWINGS

FIG. 7 is a diagram illustrating a method for adjusting coefficients in accordance with shooting settings.

FIGS. 8A to 8C are diagrams illustrating regional divisions in a screen.

DESCRIPTION OF THE EMBODIMENTS

Figure 1:
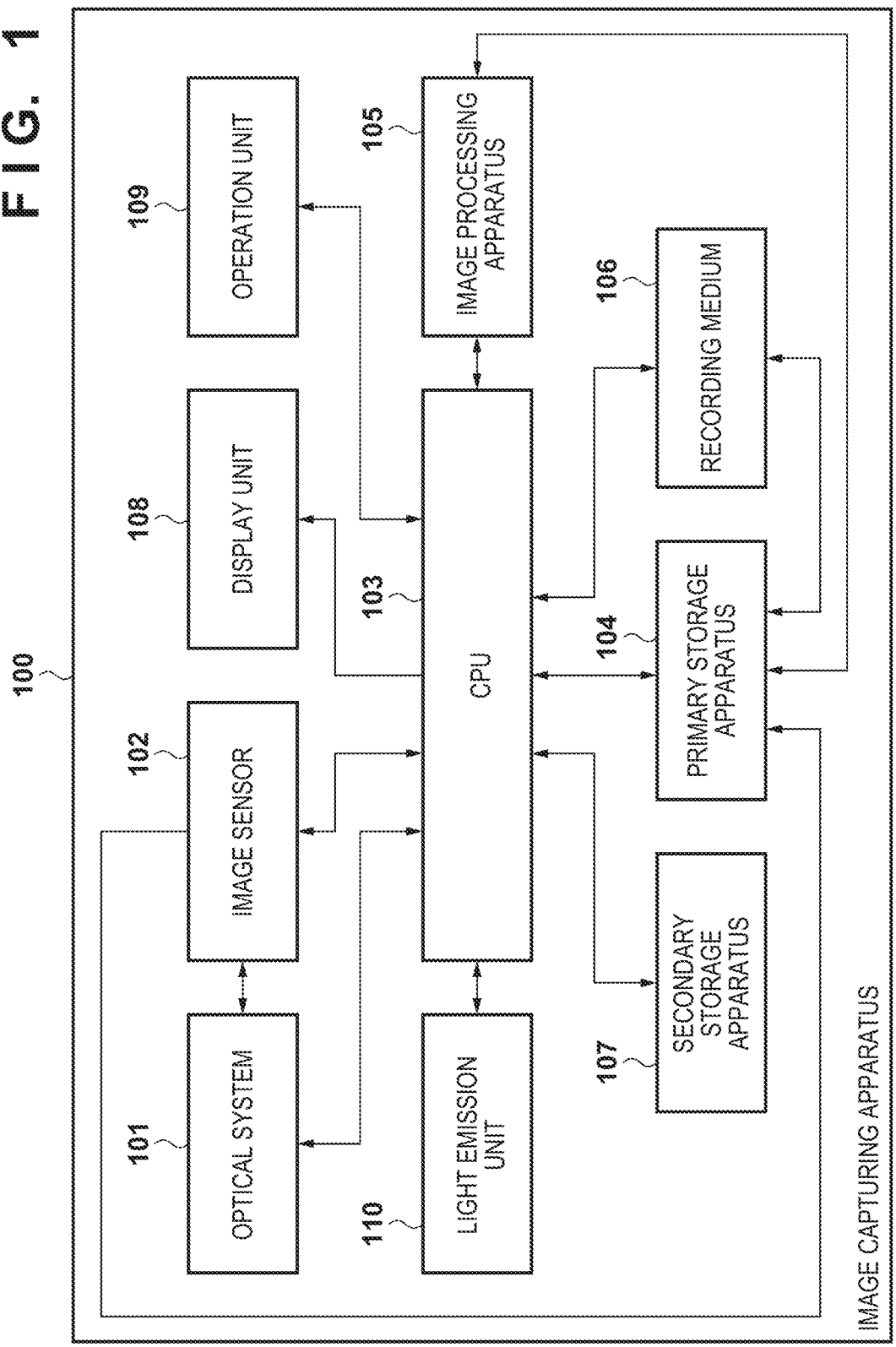
FIG. 1 is a block diagram illustrating the basic configuration of an image capturing apparatus 100 including a light emission control apparatus.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

FIG. 1 is a block diagram illustrating the basic configuration of an image capturing apparatus 100 including a light emission control apparatus. The image capturing apparatus 100 may be, for example, a camera such as a digital camera or a digital video camera, or may be an electronic device provided with camera functionality, such as a camera-equipped mobile phone or a camera-equipped computer.

An optical system 101 is an image forming optical system including a lens group, a shutter, an aperture stop, and the like. The lens group includes a correction lens for correcting hand shake, a focus lens, and the like. The optical system 101 forms subject light into an image on an image sensor 102 in accordance with a control signal from a CPU 103. The image sensor 102 is an image capturing device such as a charge-coupled device (CCD) image sensor or a complementary metal oxide semiconductor (CMOS) image sensor, and converts the light formed as an image by the optical system 101 into an image signal through photoelectric conversion.

The CPU 103 controls the various units constituting the image capturing apparatus 100 in accordance with input signals and the like, by executing programs stored in memory in advance. A primary storage apparatus 104 is a volatile storage apparatus such as random access memory (RAM), for example, and is used for the temporary storage of data, as work memory for the CPU 103, and so on. Information stored in the primary storage apparatus 104 may be used by an image processing unit 105, or may be recorded into a recording medium 106. A secondary storage apparatus 107 is a non-volatile storage apparatus such as electrically erasable programmable read-only memory (EEPROM). Programs for controlling the image capturing apparatus 100 (firmware), various types of setting information, and the like are stored in the secondary storage apparatus 107, and are used by the CPU 103.

The recording medium 106 records shot image data and the like stored in the primary storage apparatus 104. The recording medium 106 may be a recording medium which can be removed from the image capturing apparatus 100, such as a semiconductor memory card, for example. By attaching the recording medium 106 to an external device such as a personal computer (PC), data recorded in the recording medium 106 can be read out to the external device. In other words, the image capturing apparatus 100 has a mechanism for mounting, and functions for reading from and writing to, the recording medium 106.

A display unit 108 displays a viewfinder image at the time of shooting, a shot image, graphical user interface (GUI) images for dialogical operations, and the like. An operation unit 109 is an input device group that accepts user operations and transmits input information to the CPU 103, and includes buttons, levers, a touch panel, and the like, for example. An input device which uses voice, lines of sight, and so on can also be used for operations.

The image capturing apparatus 100 has a plurality of image processing patterns which the image processing unit 105 applies to captured images, and these patterns can be set as shooting modes using the operation unit 109. The image processing unit 105 carries out image processing known as "developing processing", as well as various types of processes corresponding to the shooting mode, such as tone adjustment and the like. Note that at least some of the functions of the image processing unit 105 may be implemented by software processing carried out by the CPU 103.

A light emission unit 110 emits light toward a subject or the periphery of the subject. The light emission unit 110 includes a plurality of light emission apparatuses, and each light emission apparatus can be independently controlled to emit or not emit light. Although FIG. 1 illustrates the light emission unit 110 as part of the image capturing apparatus 100, the light emission unit 110 may be prepared as an external unit, for example, in which case the light emission unit 110 can be controlled using a communication unit or the like (not shown).

Figure 2:
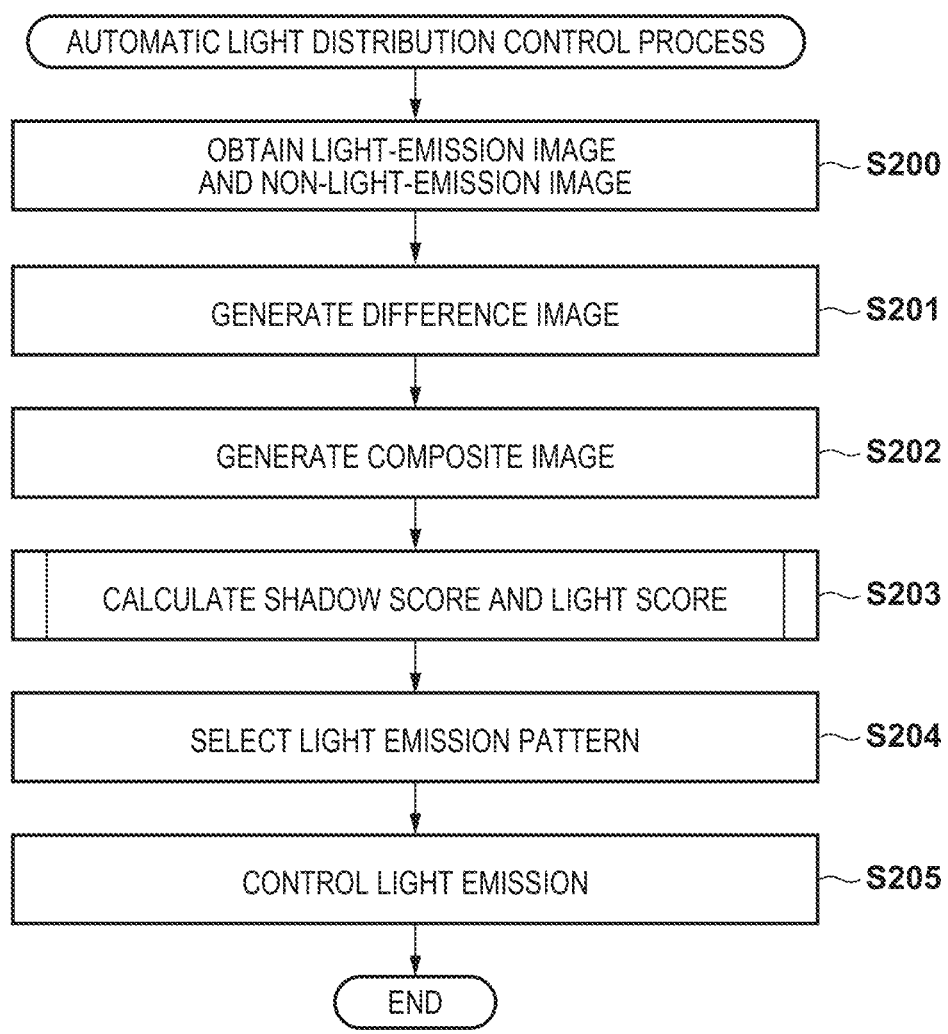
FIG. 2 is a flowchart illustrating an example of an automatic light distribution control process.

FIG. 2 is a flowchart illustrating an example of an automatic light distribution control process. The processing of this flowchart starts when, for example, a user uses the operation unit 109 to activate an automatic light distribution setting of the image capturing apparatus 100, and then uses the operation unit 109 to instruct the image capturing apparatus 100 to take a shot.

In step S200, the CPU 103 obtains a light-emission image. "Light-emission image" means an image generated by taking a shot while causing at least one of the plurality of light emission apparatuses in the light emission unit 110 to emit light. Here, a plurality of light-emission images are obtained, the images corresponding to situations where each of the plurality of light emission apparatuses emits light independently. The CPU 103 also obtains a non-light-emission image. "Non-light-emission image" means an image generated by taking a shot without causing any of the plurality of light emission apparatuses to emit light.

Figure 4:
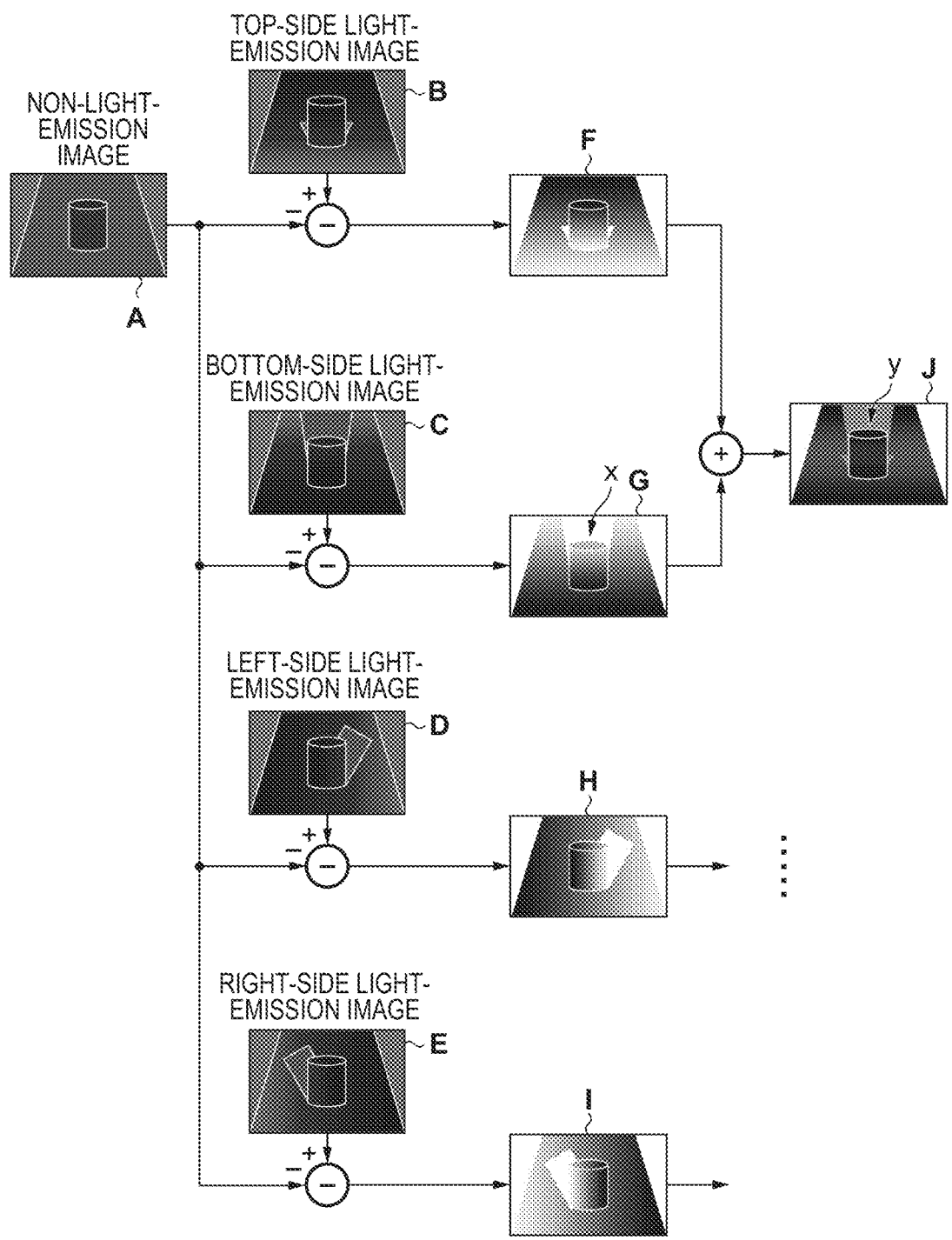
FIG. 4 is a diagram illustrating an example of a non-light-emission image, a light-emission image, a difference image, and a composite image.

The following descriptions assume that the light emission unit 110 includes four light emission apparatuses arranged so as to illuminate the subject from each of four directions, i.e., from above, below, the left, and the right. In this case, as illustrated in FIG. 4, a non-light-emission image A, as well as four light-emission images corresponding to illumination from above, below, the left, and the right (a top-side light-emission image B, a bottom-side light-emission image C, a left-side light-emission image D, and a right-side light-emission image E), are obtained. The same exposure settings are used in the shooting for obtaining the non-light-emission image A and the four light-emission images.

Note that the arrangement of the light emission apparatuses is not limited to four directions, i.e., above, below, the left, and the right of the image capturing apparatus 100. For example, light emission apparatuses installed at a plurality of positions distanced from the image capturing apparatus 100 can be used as well. Furthermore, it is not absolutely necessary for the object being illuminated to be the subject, and a light emission apparatus for illuminating the background can be prepared as well. Each light emission apparatus may use a single discharge tube as a light source, or may use one or more LEDs as a light source. Additionally, in a configuration where the plurality of light emission apparatuses are provided in a single device, and each light emission apparatus includes a plurality of light sources, one or some of the light sources may be shared among a plurality of the light emission apparatuses. For example, in a strobe apparatus where a plurality of LEDs are arranged in a ring shape, light emission from an LED located on the top side is assumed to correspond to light emission from a top-side light emission apparatus, and light emission from an LED located on the right side is assumed to correspond to light emission from a right-side light emission apparatus. At this time, an LED located on the upper-right may be caused to emit light both when only the top-side light emission apparatus is caused to emit light and when only the right-side light emission apparatus is caused to emit light.

In step S201, the CPU 103 generates a difference image. The process for generating the difference image will be described with reference to FIG. 4. The CPU 103 generates a difference image F by subtracting the non-light-emission image A from the top-side light-emission image B for each pixel, according to the following Expression 1.

$$Vf = Vb - Va \qquad (1)$$

Here, Va represents a pixel value in the non-light-emission image A, Vb represents a pixel value in the top-side light-emission image B, and Vf represents a pixel value in the difference image F.

In a similar manner, the CPU 103 generates difference images G to I by subtracting the non-light-emission image A from each of the light-emission images obtained by illuminating the subject from the other directions. In consideration of the effects of hand shake, computations may be carried out to generate the difference images after first aligning the non-light-emission image A with the light-emission images.

Note that the generation of the difference images, and the processes that follow thereafter, do not necessarily need to be carried out at the original resolution. For example, the CPU 103 may generate the difference images after first reducing the non-light-emission image and the light-emission images by a predetermined percentage. Alternatively, the CPU 103 may generate the difference images by dividing the non-light-emission image and the light-emission images into a plurality of blocks, calculating an average luminance value within each block as the pixel value of that block, and then finding the difference between the corresponding blocks.

In step S202, the CPU 103 generates a composite image by carrying out a process for adding the difference images. In the adding process, the CPU 103 generates a composite image J by adding the difference image G to the difference image F, for example. The composite image J expresses the way the light hits the subject, and the way in which shadows are produced, corresponding to a situation where two light emission apparatuses, which illuminate the subject from above and below, are caused to emit light. In the composite image J, illumination from above is added to a shadow region x of the subject produced in the difference image G by the illumination from below. This lightens the shadow, as indicated by a shadow region y.

The composite image J corresponds to an image obtained by compositing two difference images, i.e., the difference image F and the difference image G. However, another two of the difference images can be composited, or three or four of the difference images can be composited, as well. By adding the four light-emission images corresponding to the top, bottom, left, and right directions while switching whether or not to use the images for the compositing, a total of 11 composite images ($_4C_2 + _4C_3 + _4C_4$), including the composite image J, can be generated. Additionally, although the difference images F to I are not subjected to the compositing process (the adding process), handling those images as composite images for the sake of convenience results in a total of 15 composite images being obtained.

The 15 composite images correspond to the light applied to the subject in cases where whether or not to emit light is switched for the four light emission apparatuses that illuminate the subject from above, below, the left, and the right (excluding the case where none of the light emission apparatuses emit light). In other words, the pixel value is near 0 in regions where there is no light from any of the directions, with the pixel value increasing as the amount of light increases.

With respect to the generation of the composite images, it is not absolutely necessary to generate composite images corresponding to all of the difference image combinations (compositing patterns). For example, consider a case where the light emission unit 110 includes N light emission apparatuses (where N is an integer of 2 or greater), and N difference images are obtained. In this case, the CPU 103 may generate M (where M is an integer of 1 or greater) composite images corresponding to M compositing patterns for compositing two or more of the N difference images. In the example described above, N is 4, and thus M is 11 when generating composite images corresponding to all of the combinations of the difference images (all of the compositing patterns). The four difference images are also treated as composite images for the sake of convenience, and thus a total of 15 composite images are obtained.

Figure 3:
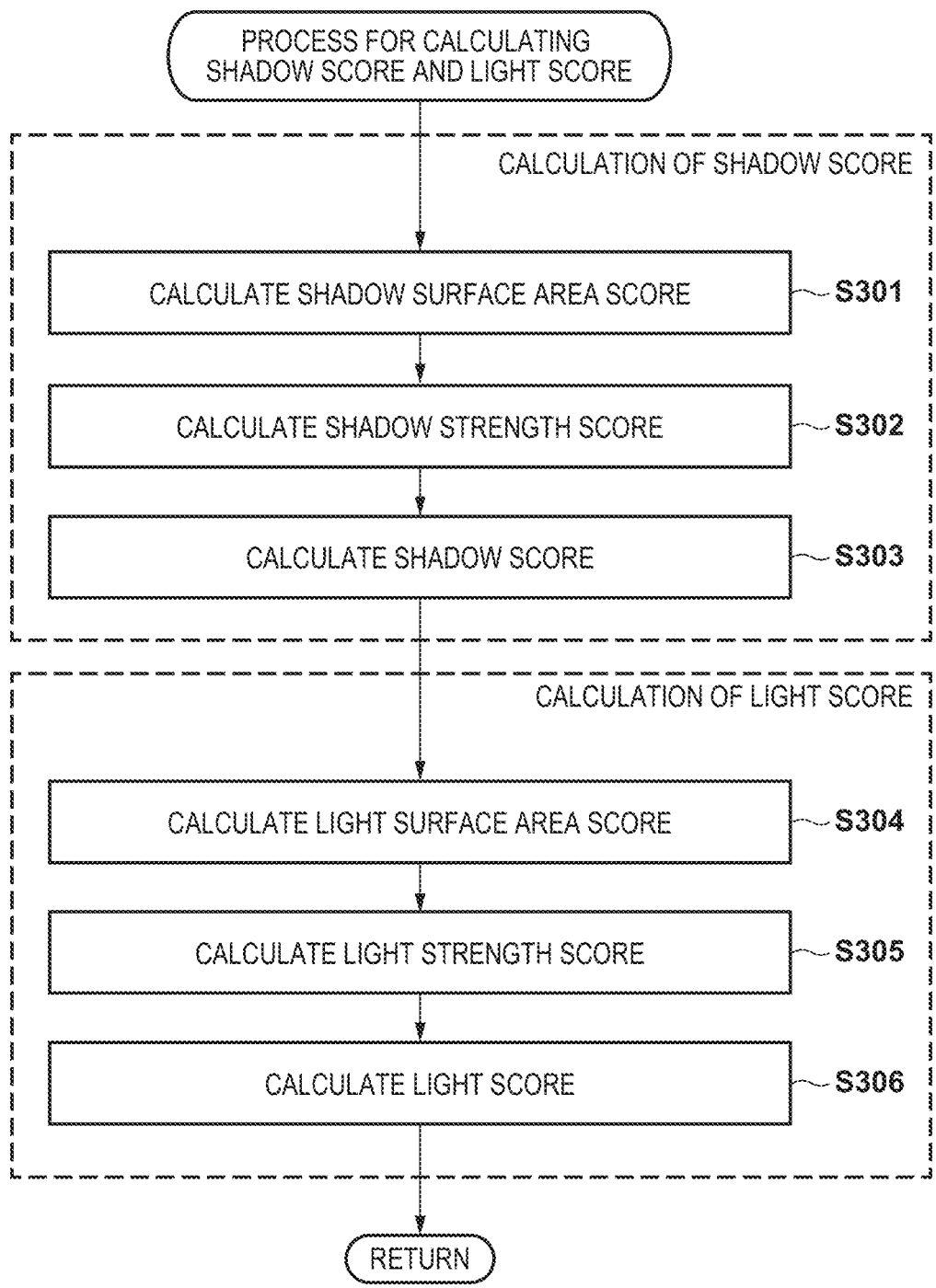
FIG. 3 is a flowchart illustrating an example of a process for calculating a shadow score and a light score.

In step S203, the CPU 103 calculates a shadow score and a light score. FIG. 3 is a flowchart illustrating an example of a process for calculating the shadow score and the light score. Steps S301 to S303 correspond to the calculation of the shadow score, and steps S304 to S306 correspond to the calculation of the light score.

The process of FIG. 3 is carried out for each of the plurality of composite images. In other words, if 15 composite images have been generated in step S202 of FIG. 2, a total of 15 sets of the shadow score and the light score are calculated, each set corresponding to one of the composite images.

In step S301, the CPU 103 calculates a shadow surface area score. A predetermined threshold Th_s for determining a shadow is used here. The CPU 103 calculates the shadow surface area score by counting the number of pixels for which the pixel value in the composite image (equivalent to the amount of applied light) is less than or equal to Th_s (less than or equal to the threshold). The shadow surface area score therefore corresponds to the surface area of regions where there is no light, or only little light, from the light emission apparatuses (shadow regions). In other words, the shadow surface area score decreases as the surface area of the shadow region becomes smaller, and the shadow surface area score increases as the surface area of the shadow region becomes larger.

In step S302, the CPU 103 calculates a shadow strength score. Here, the shadow strength score is calculated by calculating an average value of (Th_s−pixel value) for regions where the pixel value in the composite image (equivalent to the amount of applied light) is less than or equal to Th_s (shadow regions). As such, the shadow strength score decreases as the strength of the shadows in the shadow regions decreases (as the ratio of high pixel values increases), and the shadow strength score increases as the strength of the shadows in the shadow regions increases (as the ratio of low pixel values increases).

In step S303, the CPU 103 calculates the shadow score on the basis of the shadow surface area score and the shadow strength score calculated in steps S301 and S302, respectively. For example, in a case where a higher shadow score is to be calculated as the surface area of the shadow regions decreases and the strength of the shadows decreases, the CPU 103 calculates a shadow score S according to the following Expression 2.

$$S = (-Ss) \times \alpha + (-Sv) \times \beta \quad (2)$$

Here, Ss represents the shadow surface area score, and Sv represents the shadow strength score. Values found in advance through experimentation or the like, or values that change in response to user settings as will be described later in a third embodiment, can be used for coefficients α and β.

In step S304, the CPU 103 calculates a light surface area score. When calculating the shadow surface area score in step S301, the number of pixels for which the pixel value in the composite image is less than or equal to Th_s was counted. However, when calculating the light surface area score, the number of pixels for which the pixel value in the composite image is greater than or equal to Th_l (where Th_l is greater than Th_s) is counted. The light surface area score therefore corresponds to the surface area of regions where there is greater than or equal to a set amount of light from the light emission apparatuses (light regions). In other words, the light surface area score decreases as the surface area of the light region becomes smaller, and the light surface area score increases as the surface area of the light region becomes larger.

In step S305, the CPU 103 calculates a light strength score. When calculating the shadow strength score in step S302, the average value of (Th_s−pixel value) was calculated for the shadow regions. However, when calculating the light strength score, an average value of (pixel value−Th_l) is calculated for the regions where the pixel value in the composite image is greater than or equal to Th_l, for example. As such, the light strength score decreases as the strength of the light in the light regions decreases (as the ratio of low pixel values increases), and the light strength score increases as the strength of the light in the light regions increases (as the ratio of high pixel values increases).

In step S306, the CPU 103 calculates the light score on the basis of the light surface area score and the light strength score calculated in steps S304 and S305, respectively. For example, in a case where a higher light score is to be calculated as the surface area of the light regions decreases and the strength of the light increases, the CPU 103 calculates a light score L according to the following Expression 3.

$$L = Ls \times \gamma + Lv \times \delta \quad (3)$$

Here, Ls represents the light surface area score, and Lv represents the light strength score. As with the coefficients α and β, values found in advance through experimentation or the like, or values that change in response to user settings as will be described later in a third embodiment, can be used for coefficients γ and δ.

Once the calculation of the shadow score S and the light score L is complete for all of the composite images, in step S204 of FIG. 2, the CPU 103 selects a light emission pattern by selecting one of the composite images on the basis of the shadow score S and the light score L for each composite image. For example, the CPU 103 selects a light emission pattern at which P (where P is an integer greater than or equal to 1 and less than or equal to N) light emission apparatuses, which correspond to P light-emission images corresponding to P difference images constituting the composite image at which S+L is the highest, emit light. For example, when S+L is the highest for the composite image J, the light emission pattern in which the top-side and bottom-side light emission apparatuses emit light is selected. Likewise, when S+L is the highest for the difference image H, the light emission pattern in which the left-side light emission apparatus emits light is selected (as described earlier, the difference images F to I are treated as composite images).

In step S205, the CPU 103 controls the light emission of the light emission unit 110 in accordance with the light emission pattern selected in step S204. The CPU 103 also generates a final image by taking a shot in accordance with the light emission control (a final shot).

According to the first embodiment as described thus far, the image capturing apparatus 100 obtains a non-light-emission image by taking a shot without causing any of the N light emission apparatuses to emit light, and obtains N light-emission images by taking shots respectively at the times of light emissions by the N light emission apparatuses which are caused to perform the light emissions one at a time. The image capturing apparatus 100 then generates a plurality of composite images on the basis of the non-light-emission image and the N light-emission images. The plurality of composite images include N difference images, each corresponding to the difference between respective one of the N light-emission images and the non-light-emission image (these difference images are treated as composite images for the sake of convenience), and M composite images corresponding to M compositing patterns at which two or more of the N difference images are composited. The image capturing apparatus 100 then selects one of the plurality of composite images on the basis of the shadow score S and the light score L of each composite image. Finally, the image capturing apparatus 100 obtains a final image by causing P light emission apparatuses, among the N light emission apparatuses, which correspond to P light-emission images corresponding to P difference images constituting the selected composite image, to emit light. Thus according to the present embodiment, a light emission pattern for a plurality of light emission apparatuses can be selected automatically.

Although the foregoing describes an example in which the shadow score and the light score are used as the basis for selecting the composite image, the selection basis is not limited thereto. Generally speaking, the image capturing apparatus 100 may select one of the plurality of composite images on the basis of pixel values in each of the plurality of composite images. The configuration in which one composite image is selected on the basis of a feature amount, such as the shadow score and the light score of each of the plurality of composite images, is merely one example of a configuration for selecting one composite image on the basis of pixel values in each of the plurality of composite images.

The feature amount is furthermore not limited to the shadow score and the light score. For example, only one of the shadow score and the light score may be used as the feature amount, or one or more of the shadow surface area score, the shadow strength score, the light surface area score, and the light strength score may be used as the feature amount. To generalize this principle, the image capturing apparatus 100 calculates Q (where Q is an integer of 1 or greater) feature amounts for each composite image, and then selects one composite image on the basis of the Q feature amounts of each composite image. The Q feature amounts may include at least one of a feature amount based on the shadow regions (e.g., at least one of the shadow surface area score and the shadow strength score), and a feature amount based on the light regions (e.g., at least one of the light surface area score and the light strength score). However, the Q feature amounts are not limited thereto, and may include a feature amount based on highlight regions, for example (e.g., a highlight score, which will be described later in a second embodiment). Alternatively, the Q feature amounts may include a feature amount based on a contrast of pixel values (e.g., a contrast score, which will be described later in the second embodiment).

With respect to the generation of the composite images, the adjustment of the light emission amounts of the light emission apparatuses may be simulated by multiplying the difference images by various coefficients. For example, the CPU 103 adds the difference images F to H on a pixel-by-pixel basis according to the following Expression 4.

$$Vz=Vf+0.5Vg+0.5Vh \quad (4)$$

Here, Vf represents a pixel value in the difference image F, Vg represents a pixel value in the difference image G, and Vh represents a pixel value in the difference image H. A composite image corresponding to a pixel value Vz obtained from Expression 4 corresponds to the light applied when the top-side light emission amount is taken as 1 (100%) and the bottom- and left-side light emission amounts are taken as 0.5 (50%). A plurality of composite images corresponding to a variety of light emission patterns are generated by compositing the difference images F to I according to a variety of combinations of light emission amounts (coefficients). In other words, the above-described M compositing patterns may include a specific compositing pattern obtained by multiplying a specific difference image, among two or more difference images that are to be composited, by a specific coefficient greater than 0 and less than 1. Consider a situation where the composite image selected in step S204 of FIG. 2 corresponds to such a compositing pattern. In this case, in step S205, the CPU 103 adjusts the light emission amount of the light emission apparatus, which corresponds to the light-emission image corresponding to the difference image multiplied by the coefficient, in accordance with the specific coefficient. As a result, a light emission pattern for the plurality of light emission apparatuses can be selected automatically in accordance not only with whether or not light is emitted, but also with the amount of light emitted.

Additionally, using LEDs or the like, which are capable of continually emitting light, as the light emission apparatuses makes it possible for the user to adjust the angle of view and so on while confirming the image obtained with the selected light emission pattern.

Second Embodiment

The second embodiment will describe variation pertaining to the calculation of the shadow score and light score in step S203, and to the selection of the light emission pattern in step S204, in FIG. 2. In the present embodiment, a feature amount based on highlight regions and a feature amount based on a contrast of pixel values are used in addition to the shadow score and the light score.

In the second embodiment, the basic configuration of the image capturing apparatus 100 is the same as in the first embodiment. The following will primarily describe areas that are different from the first embodiment.

Figure 5A:
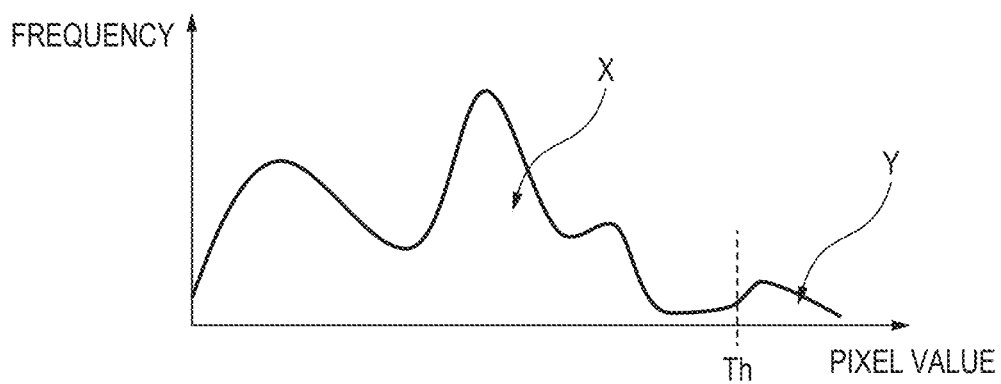
FIGS. 5A and 5B are diagrams illustrating examples of histograms generated on the basis of pixel values in a composite image.
Figure 5B:
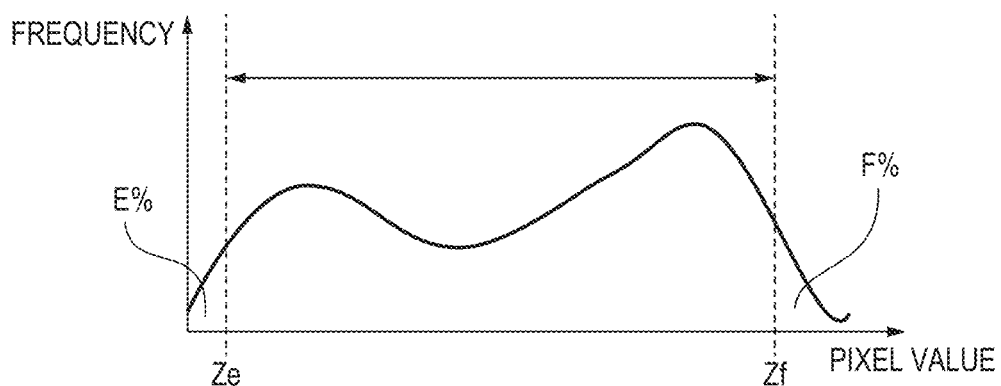

FIGS. 5A and 5B are diagrams illustrating examples of histograms generated on the basis of pixel values in a composite image. First, the feature amount based on highlight regions (a highlight score) will be described with reference to FIG. 5A.

When a subject is illuminated by flash light, the flash light may be regularly reflected depending on the shape of the subject. This can cause some parts of the subject to appear shiny. To determine whether or not this phenomenon is occurring, for example, a given threshold Th (where Th is greater than Th_l) is set, and a highlight score can then be calculated from the number of pixels having a pixel value greater than or equal to that threshold, as indicated in FIG. 5A. Here, in a histogram, when highlights are present, a group of high pixel values, indicated by Y in FIG. 5A, may arise with respect to a distribution of pixel values outside of highlight areas, indicated by X in FIG. 5A. Accordingly, for example, the threshold Th can be set as a pixel value that separates the group present on the high-luminance side of the histogram, and a highlight score H can be calculated by computing the following on the basis of a number of pixels Y that are greater than or equal to Th.

$$H=(-Y)\times\varepsilon \quad (5)$$

As with the coefficients α and β, values found in advance through experimentation or the like, or values that change in response to user settings as will be described later in a third embodiment, can be used for a coefficient ε.

The feature amount based on the contrast of pixel values (a contrast score) will be described next with reference to FIG. 5B. It is possible to calculate a contrast, indicating a difference between light and dark areas in an image, as one indicator for determining a favorable light distribution (light emission pattern). Accordingly, for example, the frequency of pixel values on a low side and the frequency of pixel values on a high side are counted in order to determine the degree of contrast, as indicated in FIG. 5B. A pixel value Ze (a first pixel value) for which the count number on the low side of the pixel values is E % (a first percentage) and a pixel value Zf (a second pixel value) for which the count number on the high side of the pixel values is F % (a second percentage) are then calculated. In other words, the percentage of pixels having a pixel value less than or equal to the pixel value Ze (less than or equal to the first pixel value) is E % (the first percentage), and the percentage of pixels having a pixel value greater than or equal to the pixel value Zf (greater than or equal to the second pixel value) is F % (the second percentage).

A contrast score C can be calculated by computing the following, on the basis of the pixel values Ze and Zf calculated in this manner.

$$C=(Zf-Ze)\times\zeta \quad (6)$$

As with the coefficients α and β, values found in advance through experimentation or the like, or values that change in response to user settings as will be described later in a third embodiment, can be used for a coefficient ζ.

The light emission pattern can be selected in step S204 on the basis of the highlight score H and the contrast score C calculated in this manner. For example, the CPU 103 selects a light emission pattern at which P (where P is an integer greater than or equal to 1 and less than or equal to N) light emission apparatuses, which correspond to P light-emission images corresponding to P difference images constituting the composite image at which S+L+H+C is the highest, emit light.

Note that with respect to the highlight score and the contrast score, a pixel value histogram can also be calculated from an image that is equivalent to a final image, obtained by once again adding the original non-light-emission image A to the composite image J illustrated in FIG. 4, so as to take the final appearance of the image into account.

Thus according to the second embodiment described thus far, the highlight score and the contrast score can be used as a feature amount based on highlight regions and the feature amount based on the contrast of pixel values, respectively.

Third Embodiment

A third embodiment will describe a configuration that determines a weight of each of two or more feature amounts. For example, with respect to the adding of the shadow score S and the light score L (S+L) described in the first embodiment, a plurality of feature amounts are being subjected to weighted addition using the effects of the coefficients α, β, γ, and δ. Thus the light emission pattern (the composite image) is being selected on the basis of a composite feature amount (S+L) generated from the weighted addition of a plurality of feature amounts. The same applies to S+L+H+C described in the second embodiment. Thus adjusting the coefficients α to ζ makes it possible to control which of the feature amounts is to be prioritized.

In the third embodiment, the basic configuration of the image capturing apparatus 100 is the same as in the first embodiment. The following will primarily describe areas that are different from the first embodiment.

The following can be given as examples of methods for adjusting the coefficients α to ζ.

a user sets his/her preference in advance.

settings are made in accordance with the shooting settings.

settings are made in accordance with the type of the subject.

settings are made in accordance with the type of post-processing.

Each of these methods will be described next.

User Sets his/her Preference in Advance

Figure 6:
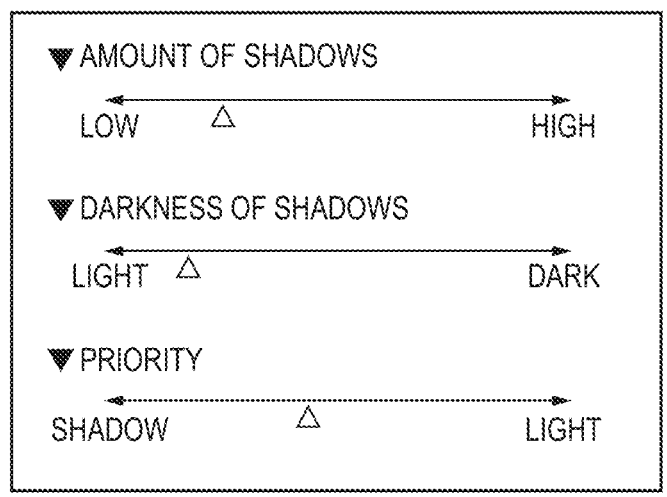
FIG. 6 is a diagram illustrating a UI for adjusting coefficients α to ζ.

FIG. 6 is a diagram illustrating a UI for adjusting the coefficients α to ζ. With this UI, the user can select his or her preferred amount of shadows and darkness of shadows, as well as whether light or shadow is to be prioritized.

Accordingly, when, for example, the user selects "high" as the amount of shadows, the CPU 103 sets the coefficient α for the shadow surface area score Ss indicated in Expression 2 to a value at which greater shadow surface areas have a greater effect on the light emission pattern selection (i.e., a negative value having a high absolute value). Additionally, when, for example, the user selects "dark" as the darkness of shadows, the CPU 103 sets the coefficient β for the shadow strength score Sv indicated in Expression 2 to a value at which greater shadow strengths have a greater effect on the light emission pattern selection (i.e., a negative value having a high absolute value). Furthermore, when the user selects "light" to be prioritized, the CPU 103 sets the coefficients α to δ so that the light score indicated in Expression 3 has a greater effect than the shadow score indicated in Expression 3.

In this manner, the weighting of each feature amount can be determined in accordance with user instructions made through the UI illustrated in FIG. 6.

Settings Made in Accordance with Shooting Settings

FIG. 7 is a diagram illustrating a method for adjusting the coefficients in accordance with shooting settings. The image capturing apparatus 100 presents, to the user, options that use intuitive expressions, as indicated by column 701 in FIG. 7. When the user selects one of the displayed options, the image capturing apparatus 100 takes a shot using shooting settings based on the selected item. At this time, the intuitive expressions can be used to select the light emission pattern. For example, if the user has selected the expression "crisp and vivid", an image close to the user's preferences can likely be obtained by prioritizing a higher shadow strength. Accordingly, the CPU 103 sets the coefficient β for the shadow strength score Sv indicated in Expression 2 to a value at which greater shadow strengths have a greater effect on the light emission pattern selection (i.e., a negative value having a high absolute value). The user's assumed preferences are defined in column 702, and the corresponding coefficient settings are defined in column 703, for each of the options listed in column 701, for the other options as well.

In this manner, the weighting of each feature amount can be determined in accordance with user instructions made through a UI including the options indicated in column 701 of FIG. 7.

Settings Made in Accordance with Type of Subject

With respect to the contrast or highlights described in the second embodiment, there are cases where the desired contrast or highlights change depending on the subject. For example, when the subject is a living thing or the like, a lower contrast may be desired, whereas when the subject is a man-made object, a higher contrast may be desired. Additionally, if the subject is originally a glossy object, there are situations where highlights are permitted as a method for expressing the qualities of the subject. Accordingly, the CPU 103 determines the coefficients $\epsilon$, $\zeta$ and so on used to calculate the contrast score, the highlight score, and so on in accordance with the type of the subject, recognized (detected) by a subject recognition technique, for example. Note that a given known technique can be used as the subject recognition technique. The coefficients $\alpha$ to $\delta$ may also be determined on the basis of the type of the subject.

Settings Made in Accordance with Type of Post-Processing

While the aforementioned feature amounts pertain to the manner in which shadows, light, contrast, highlights, and so on appear, these factors can be improved to a certain extent through image processing serving as post-processing. For example, even if shadows have arisen to a certain degree, a dark area correction technique makes it possible to correct the image so that those shadows are less apparent. Additionally, image correction such as suppressing highlights or the like is also possible by using a contrast correction technique, a high dynamic range technique, or the like. As such, the values of the coefficients $\alpha$ to $\zeta$ may be determined so that if a function which cancels out a corresponding factor is active, the weighting for that factor is reduced.

In this manner, the weighting of each feature amount can be determined in accordance with user instructions for selecting image processing to serve as post-processing.

According to the third embodiment as described thus far, by adjusting the coefficients $\alpha$ to $\zeta$ (determining the weighting for respective feature amounts) on the basis of user instructions, the type of the subject, or the like, a light emission pattern that better reflects the user's intentions can be selected.

Fourth Embodiment

A fourth embodiment will describe a configuration in which a screen is divided into regions and the score is calculated for each of the resulting regions. In the fourth embodiment, the basic configuration of the image capturing apparatus 100 is the same as in the first embodiment. The following will primarily describe areas that are different from the first embodiment.

FIGS. 8A to 8C are diagrams illustrating regional divisions in a screen. FIG. 8A illustrates a scene in which a subject is placed upon a desk. A subject region, illustrated in FIG. 8B, and a background region (the desk), illustrated in FIG. 8C, are then extracted from that scene. Note that in FIG. 8C, a region beyond the desk, where the flash light does not reach, is indicated as "other".

First, with respect to the subject region, a color of an in-focus part can be extracted, and a region having colors similar to the stated color can then be extracted as the subject region, for example. Alternatively, the image capturing apparatus 100 may be provided with a function for measuring distances within the screen, and a region within a set distance range relative to the in-focus part can then be extracted as the subject region. With respect to the background region, regions having similar brightnesses as regions adjacent to the aforementioned subject region can be extracted, regions in which the distance changes continuously can be extracted, and so on, for example.

Once the subject region and the background region are extracted in this manner, information pertaining to the types of the regions can be used when calculating the scores in step S203 of FIG. 2. Although the first embodiment uses the entire screen as the region used to determine the scores, the present embodiment uses only the range extracted as the subject region as the region for calculating the light score, for example. This makes it possible to use a score pertaining particularly to the light falling on the subject as the basis for selecting the light emission pattern. Alternatively, with respect to the region for calculating the shadow score, using only the range extracted as the background region makes it possible to use a score pertaining particularly to the shadows from the subject falling on the background as the basis for selecting the light emission pattern.

According to the fourth embodiment as described thus far, by dividing a scene (a screen) into a plurality of regions, such as a subject region and a background region, more diverse bases can be used for selecting the light emission pattern.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-091616, filed May 14, 2019 which is hereby incorporated by reference herein in its entirety.

What is claimed is:

1. An image capturing apparatus comprising at least one processor and/or at least one circuit which functions as:
a control unit configured to carry out control so as to obtain a first image by taking a shot without causing any of N light emission apparatuses (where N is an integer of 2 or greater) to emit light, and to obtain N second images by taking shots respectively at the times of light emissions by the N light emission apparatuses which are caused to perform the light emissions one at a time;
a generating unit configured to generate a plurality of third images including N difference images, each difference image corresponding to a difference between respective one of the N second images and the first image, and M composite images (where M is an integer of 1 or greater) corresponding to M compositing patterns at which two or more of the N difference images are composited; and
a selection unit configured to select one of the plurality of third images on the basis of a pixel value in each of the plurality of third images,
wherein the control unit carries out control so as to obtain a fourth image by causing P light emission apparatuses (where P is an integer greater than or equal to 1 and less than or equal to N), among the N light emission apparatuses, that correspond to P of the N second images corresponding to P of the N difference images constituting the selected third image, to emit light.

2. The image capturing apparatus according to claim 1, wherein the selection unit:
calculates, for each of the plurality of third images, Q feature amounts (where Q is an integer of 1 or greater) including at least one of a feature amount based on a shadow region in which a pixel value is less than or equal to a first threshold, a feature amount based on a light region in which a pixel value is greater than or equal to a second threshold that is greater than the first threshold, a feature amount based on a highlight region in which a pixel value is greater than or equal to a third threshold that is greater than the second threshold, and a feature amount based on a contrast of a pixel value; and
selects one of the plurality of third images on the basis of the Q feature amounts of each of the plurality of third images.

3. The image capturing apparatus according to claim 2, wherein Q is an integer of 2 or greater; and
the selection unit:
generates a composite feature amount by carrying out weighted adding of the Q feature amounts for each of the plurality of third images; and
selects one of the plurality of third images on the basis of the composite feature amount of each of the plurality of third images.

4. The image capturing apparatus according to claim 3, wherein the selection unit determines a weight for each of the Q feature amounts in the weighted adding in accordance with a user instruction.

5. The image capturing apparatus according to claim 3, wherein the at least one processor and/or at least one circuit further functions as:
a detection unit configured to detect a type of a subject, wherein the selection unit determines a weight for each of the Q feature amounts in the weighted adding on the basis of the type of the subject.

6. The image capturing apparatus according to claim 2, wherein the at least one processor and/or at least one circuit further functions as:
a division unit configured to divide a screen into a plurality of regions including a first region and a second region,
wherein Q is an integer of 2 or greater; and
the selection unit calculates a different feature amount in the first region and the second region.

7. The image capturing apparatus according to claim 2, wherein the feature amount based on the shadow region includes at least one of a feature amount based on a number of pixels in the shadow region, and a feature amount based on an average value of a difference between the first threshold and each pixel value in the shadow region.

8. The image capturing apparatus according to claim 2, wherein the feature amount based on the light region includes at least one of a feature amount based on a number of pixels in the light region, and a feature amount based on an average value of a difference between each pixel value and the second threshold in the light region.

9. The image capturing apparatus according to claim 2, wherein the feature amount based on the highlight region includes a feature amount based on a number of pixels in the highlight region.

10. The image capturing apparatus according to claim 2, wherein the feature amount based on the contrast includes a feature amount based on a difference between a first pixel value and a second pixel value, the second pixel value being greater than the first pixel value;
a percentage of pixels having a pixel value less than or equal to the first pixel value is a first percentage; and
a percentage of pixels having a pixel value greater than or equal to the second pixel value is a second percentage.

11. The image capturing apparatus according to claim 1, wherein the M compositing patterns include a specific compositing pattern at which a specific difference image, among the two or more of the N difference images that are to be composited, is multiplied by a specific coefficient greater than 0 and less than 1; and
in a case where the third image selected by the selection unit corresponds to the specific compositing pattern, when the control unit causes the P light emission apparatuses to emit light, the control unit adjusts, in accordance with the specific coefficient, an amount of light emitted by the light emission apparatus corresponding to the second image that corresponds to the specific difference image.

12. A light emission control apparatus comprising at least one processor and/or at least one circuit which functions as:
an obtainment unit configured to obtain a first image generated by taking a shot without causing any of N light emission apparatuses (where N is an integer of 2 or greater) to emit light, and obtain N second images generated by taking shots respectively at the times of light emissions by the N light emission apparatuses which are caused to perform the light emissions one at a time;
a generating unit configured to generate a plurality of third images including N difference images, each difference image corresponding to a difference between respective one of the N second images and the first image, and M composite images (where M is an integer of 1 or greater) corresponding to M compositing patterns at which two or more of the N difference images are composited;

a selection unit configured to select one of the plurality of third images on the basis of a pixel value in each of the plurality of third images; and a control unit configured to carry out control so as to cause P light emission apparatuses (where P is an integer greater than or equal to 1 and less than or equal to N), among the N light emission apparatuses, that correspond to P of the N second images corresponding to P of the N difference images constituting the selected third image, to emit light.

13. An image capturing method executed by an image capturing apparatus, comprising:

carrying out control so as to obtain a first image by taking a shot without causing any of N light emission apparatuses (where N is an integer of 2 or greater) to emit light, and to obtain N second images by taking shots respectively at the times of light emissions by the N light emission apparatuses which are caused to perform the light emissions one at a time;

generating a plurality of third images including N difference images, each difference image corresponding to a difference between respective one of the N second images and the first image, and M composite images (where M is an integer of 1 or greater) corresponding to M compositing patterns at which two or more of the N difference images are composited;

selecting one of the plurality of third images on the basis of a pixel value in each of the plurality of third images; and carrying out control so as to obtain a fourth image by causing P light emission apparatuses (where P is an integer greater than or equal to 1 and less than or equal to N), among the N light emission apparatuses, that correspond to P of the N second images corresponding to P of the N difference images constituting the selected third image, to emit light.

14. A light emission control method executed by a light emission control apparatus, comprising:

obtaining a first image generated by taking a shot without causing any of N light emission apparatuses (where N is an integer of 2 or greater) to emit light, and obtaining N second images generated by taking shots respectively at the times of light emissions by the N light emission apparatuses which are caused to perform the light emissions one at a time;

generating a plurality of third images including N difference images, each difference image corresponding to a difference between respective one of the N second images and the first image, and M composite images (where M is an integer of 1 or greater) corresponding to M compositing patterns at which two or more of the N difference images are composited;

selecting one of the plurality of third images on the basis of a pixel value in each of the plurality of third images; and carrying out control so as to cause P light emission apparatuses (where P is an integer greater than or equal to 1 and less than or equal to N), among the N light emission apparatuses, that correspond to P of the N second images corresponding to P of the N difference images constituting the selected third image, to emit light.

* * * * *